(12) United States Patent
Huang

(10) Patent No.: US 11,379,956 B2
(45) Date of Patent: Jul. 5, 2022

(54) IMAGE PROCESSING CIRCUIT AND ASSOCIATED IMAGE PROCESSING METHOD

(71) Applicant: Realtek Semiconductor Corp., HsinChu (TW)

(72) Inventor: Yu-Shiang Huang, New Taipei (TW)

(73) Assignee: Realtek Semiconductor Corp., HsinChu (TW)

(*) Notice: Subject to any disclaimer, the term of this patent is extended or adjusted under 35 U.S.C. 154(b) by 106 days.

(21) Appl. No.: 16/925,278

(22) Filed: Jul. 9, 2020

(65) Prior Publication Data
US 2021/0027433 A1 Jan. 28, 2021

(30) Foreign Application Priority Data

Jul. 26, 2019 (TW) ................... 108126549

(51) Int. Cl.
*G06T 5/00* (2006.01)
*G06T 5/20* (2006.01)

(52) U.S. Cl.
CPC .......... *G06T 5/003* (2013.01); *G06T 5/20* (2013.01); *G06T 2207/10004* (2013.01)

(58) Field of Classification Search
None
See application file for complete search history.

(56) References Cited

U.S. PATENT DOCUMENTS

| 7,881,549 B2 * | 2/2011 | Yamashita | G06T 5/004 382/254 |
| 7,894,684 B2 * | 2/2011 | Monobe | H04N 1/4092 382/254 |
| 8,000,551 B2 * | 8/2011 | Arici | G06T 5/004 382/260 |

(Continued)

FOREIGN PATENT DOCUMENTS

| JP | 2012-198945 | * 10/2012 |
| TW | 201044860 A1 | 12/2010 |
| TW | 201224999 A1 | 6/2012 |

OTHER PUBLICATIONS

Kim, Sang Ho, and Jan P. Allebach. "Optimal unsharp mask for image sharpening and noise removal." Journal of Electronic Imaging 14.2 (2005): 023005. (Year: 2005).*

*Primary Examiner* — Andrae S Allison
(74) *Attorney, Agent, or Firm* — Winston Hsu

(57) ABSTRACT

The present invention discloses an image processing circuit, wherein the image processing circuit comprises a receiving circuit, a sharpness processing circuit, a luminance variation processing circuit and an output circuit. In the operations of the image processing circuit, the receiving circuit is configured to receive image data; the sharpness processing circuit is configured to perform a high-pass filtering operation on the image data to generate processed image data; the luminance variation processing is configured to determine a high frequency component of each pixel within the image data, and for each pixel, the luminance variation processing circuit is configured to calculate a difference between high (Continued)

frequency components of the pixel and neighboring pixel(s) to generate auxiliary image data; and the output circuit is configured to generate output image according to the processed image data and the auxiliary image data.

16 Claims, 3 Drawing Sheets

(56) References Cited

U.S. PATENT DOCUMENTS

| | | | | |
|---|---|---|---|---|
| 8,098,961 | B2* | 1/2012 | Ida | G06T 3/403 |
| | | | | 382/299 |
| 8,406,559 | B2* | 3/2013 | Wu | G06T 5/003 |
| | | | | 382/274 |
| 8,472,724 | B2* | 6/2013 | Lertrattanapanich | G06T 5/002 |
| | | | | 382/205 |
| 8,582,912 | B2* | 11/2013 | Li | G06T 7/0002 |
| | | | | 382/260 |
| 10,140,690 | B2* | 11/2018 | Chakraborty | G06T 5/003 |

* cited by examiner

IMAGE PROCESSING CIRCUIT AND ASSOCIATED IMAGE PROCESSING METHOD

BACKGROUND OF THE INVENTION

1. Field of the Invention

The invention relates to an image processing circuit, more particularly to an image processing circuit for improving sharpness of an image.

2. Description of the Prior Art

Conventionally, the linear high pass filter (HPF) is utilized to improve image sharpness. However, when the frequency of the linear HPF is high (or the length of the HPF is short), the original texture of the image will be damaged, resulting in that the edge luminance of an object is higher than its central luminance. In addition, when the frequency of the linear HPF is low (or the length of the HPF is long), the sharpened object becomes thicker and a thicker ringing is formed at the edge of the object, which affects the display quality.

SUMMARY OF THE INVENTION

In view of this, an objective of the invention is to provide an image processing circuit which can effectively improving the sharpness of the image while preventing the conventional defect from appearing in the output image. In the manner, the conventional problem can be solved.

An embodiment of the invention provides an image processing circuit comprising a receiving circuit, a sharpness processing circuit, a luminance variation processing circuit and an output circuit. The receiving circuit is configured to receive image data. The sharpness processing circuit is configured to perform a high-pass filtering operation on the image data to generate processed image data. The luminance variation processing circuit is configured to determine a high frequency component of each pixel within the image data and calculate, for each pixel, a difference between the high frequency component of the pixel and the high frequency component of neighboring pixel(s) to generate auxiliary image data. The output circuit, configured to generate an output image according to the processed image data and the auxiliary image data.

Another embodiment of the invention provides an image processing method comprising: receiving image data; performing a high-pass filtering operation on the image data to generate processed image data; determining a high frequency component of each pixel within the image data; calculating, for each pixel, a difference between the high frequency component of the pixel and the high frequency component of neighboring pixel(s) to generate auxiliary image data; and generating an output image according to the processed image data and the auxiliary image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
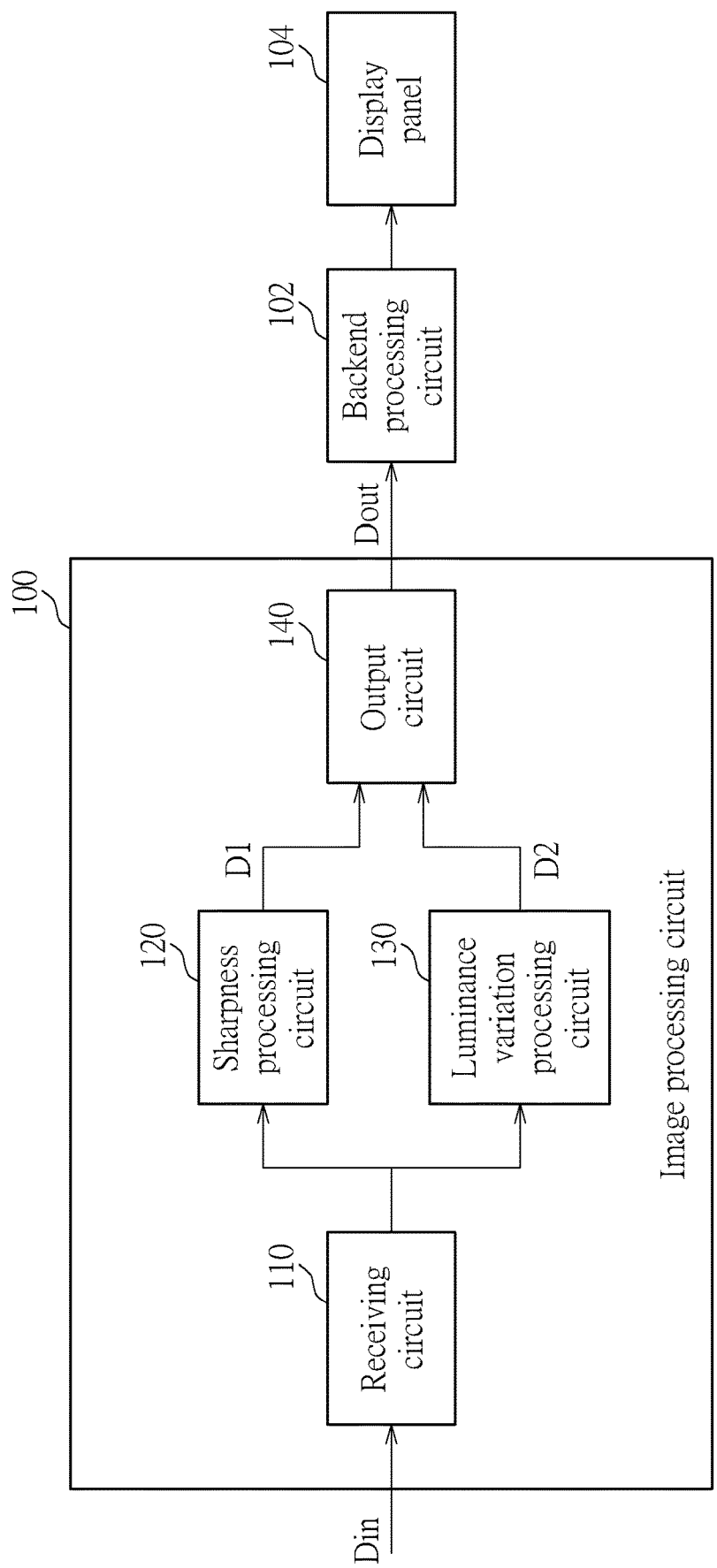
FIG. 1 is a schematic block diagram of an image processing circuit according to an embodiment of the invention.

FIG. 1 is a schematic block diagram of an image processing circuit according to an embodiment of the invention. As shown in FIG. 1, the image processing circuit 100 comprises a receiving circuit 110, a sharpness processing circuit 120, a luminance variation processing circuit 130 and an output circuit 140. In this embodiment, the image processing circuit 100 is configured to receive image data (an image frame) Din and sharpen the image data to generate an output image Dout. The output image Dout may be further processed by a backend processing circuit 102 and then provided to a display panel 104 for being displayed on the display panel 104.

In the operations of the image processing circuit 100, the receiving circuit 110 is configured to receive the image data Din. The sharpness processing circuit 120 is configured to perform a high-pass filtering operation on the image data Din to generate processed image data D1. For example, the high-pass filtering operation may be performed by using any suitable high-pass filtering operator, such as (−0.1, −0.3, +0.8, −0.3, −0.1), to perform the corresponding calculation on the image data Din and the calculation result is then added to the image data Din to generate the processed image data D1. The luminance variation processing circuit 130 is configured to determine a high frequency component of each pixel within the image data Din. In addition, for each pixel, the luminance variation processing circuit 130 is configured to calculate a difference between the high frequency component of the pixel and the high frequency component of neighboring pixel(s) to generate auxiliary image data D2. For example, for each pixel of a plurality of consecutive pixels in the image data Din, the luminance variation processing circuit 130 is configured to calculate the high frequency component of the pixel according to whether a group of N pixels on one side of the pixel and a group of M pixels on another side of the pixel both have pixel(s) whose luminance are higher than luminance of the pixel or both have pixel(s) whose luminance are lower than the luminance of the pixel, where N and M are positive integers that may be the same or different. For example, suppose that N is 3 and M is 3. Next, for each pixel, the luminance variation processing circuit 130 calculates the difference between the high frequency component of the pixel and the high frequency component of neighboring pixel(s) to generate auxiliary image data D2. Finally, the output circuit 140 is configured to generate the output image Dout according to the processed image data D1 and the auxiliary image data D2.

In the following paragraphs, exemplary image data is provided for more detailed discussion. In the following example, suppose that the image data Din comprises consecutive pixels in the same row or the same column in the image frame, and there are 18 consecutive pixels provided as an example for the discussion in the following paragraphs.

Suppose that the pixel values of the pixels in positions 1-18 of the image data Din are 150, 150, 150, 150, 150, 200, 200, 200, 200, 150, 150, 150, 150, 200, 200, 200, 200 and 200. After performing high-pass filtering operation by using high-pass filtering operator, the processed image data D1, the high frequency component and the auxiliary image data D2 are listed in the following Table 1.

TABLE 1

| | Pixel position | | | | | | | | | |
|---|---|---|---|---|---|---|---|---|---|---|
| | 1 | 2 | 3 | 4 | 5 | 6 | 7 | 8 | 9 | 10 |
| Original luminance of the image data Din | 150 | 150 | 150 | 150 | 150 | 200 | 200 | 200 | 200 | 150 |
| The results after high-pass filtering | 0 | 0 | 0 | −5 | −20 | +20 | +5 | +5 | +20 | −20 |
| Processed image data D1 | 150 | 150 | 150 | 145 | 130 | 220 | 205 | 205 | 220 | 130 |
| High frequency component | 0 | 0 | 0 | 0 | 0 | 0 | +50 | +50 | 0 | 0 |
| Auxiliary image data D2 | 0 | 0 | 0 | 0 | 0 | −40 | 0 | 0 | −40 | +40 |
| Output image Dout | 150 | 150 | 150 | 145 | 130 | 180 | 205 | 205 | 180 | 170 |

| | Pixel position | | | | | | | |
|---|---|---|---|---|---|---|---|---|
| | 11 | 12 | 13 | 14 | 15 | 16 | 17 | 18 |
| Original luminance of the image data Din | 150 | 150 | 150 | 200 | 200 | 200 | 200 | 200 |
| The results after high-pass filtering | −5 | −5 | −20 | +20 | +5 | 0 | 0 | 0 |
| Processed image data D1 | 145 | 145 | 130 | 220 | 205 | 200 | 200 | 200 |
| High frequency component | −50 | −50 | 0 | 0 | 0 | 0 | 0 | 0 |
| Auxiliary image data D2 | 0 | 0 | +40 | 0 | 0 | 0 | 0 | 0 |
| Output image Dout | 145 | 145 | 170 | 220 | 205 | 200 | 200 | 200 |

Referring to the example shown in Table 1, taking the high-pass filtering operator (−0.1, −0.3, +0.8, −0.3, −0.1) as an example, the result obtained after performing high-pass filtering on the P (x) is expressed as:

$$((-0.1)*P(x-2)+(-0.3)*P(x-1)+0.8*P(x)+(-0.3)*P(x+1)+(-0.1)*P(x+2))$$

where P (x−1) and P (x−2) represents the luminance of the first and second pixels on the left side of the pixel P (x), and P (x+1) and P (x+2) represents the luminance of the first and second pixels on the right side of the pixel P(x). The processed image data D1 is the result obtained by adding the results of high-pass filtering to the original luminance of the image data Din. Regarding the calculation of the High frequency component, for each pixel, when a group of 3 pixels on the left side of the pixel and a group of 3 pixels on the right side of the pixel both have pixel(s) whose luminance are higher than luminance of the pixel or both have pixel(s) whose luminance are lower than the luminance of the pixel, the luminance variation processing circuit 130 is configured to calculate a difference between the luminance of the pixel and the luminance of the 3 pixels on the left side and the 3 pixels on the right side to calculate the high frequency component of the pixel. In an example, the luminance variation processing circuit 130 may select one pixel, which has the greatest luminance difference with respect to the pixel, from the 3 pixels on the left side and the 3 pixels on the right side of the pixel to calculate the high frequency component of the pixel.

Taking the pixel at the position 7 as an example, since there is some pixel among the group of pixels at the positions 4-6 whose luminance is lower than the luminance of the pixel at the position 7 and there is also some pixel among the group of pixels at the positions 8-10 whose luminance is lower than the luminance of the pixel at the position 7 (that is, the pixels at the positions 4, 5 and 10) and the lowest luminance among the pixels at the positions 4, 5 and 10 is 150; therefore the high frequency component of the pixel at the position 7 is obtained by subtracting the lowest luminance 150 from the luminance 200 of the pixel at the position 7, and the resulting high frequency component of the pixel at the position 7 is +50.

In another example, the pixel at the position 11 is taken for illustration. Since there is some pixel among the group of pixels at the positions 8-10 whose luminance is higher than the luminance of the pixel at the position 11 and there is also some pixel among the group of pixels at the positions 12-14 whose luminance is higher than the luminance of the pixel at the position 11 (that is, the pixels at the positions 8, 9 and 14) and the highest luminance among the pixels at the positions 8, 9 and 14 is 200; therefore the high frequency component of the pixel at the position 11 is obtained by subtracting the high luminance 200 from the luminance 150 of the pixel at the position 11, and the resulting high frequency component of the pixel at the position 11 is −50.

On the other hand, for each pixel, when not both the group of 3 pixels on the left side of the pixel and the group of 3 pixels on the right side of the pixel have pixel(s) whose luminance is/are higher than the luminance of the pixel, or not both the group of 3 pixels on the left side of the pixel and the group of 3 pixels on the right side of the pixel have pixel(s) whose luminance is/are lower than the luminance of the pixel, the luminance variation processing circuit 130 is configured to directly set the high frequency component of the pixel to zero or a default value. Taking the pixel at the position 6 as an example, since there is some pixel among the group of pixels at the positions 3-5 whose luminance is lower than the luminance of the pixel at the position 6 but there is no pixel among the group of pixels at the positions 7-9 whose luminance is lower than the luminance of the pixel at the position 6, the luminance variation processing circuit 130 may directly set the high frequency component of the pixel at the position 6 to zero.

Next, regarding the auxiliary image data D2, for each pixel, the luminance variation processing circuit 130 is configured to subtract the high frequency components of neighboring pixels on both sides of the pixel from the high frequency component of the pixel to obtain a result and multiply the result by a ratio parameter (for example, 0.8) to generate the value of the pixel in the auxiliary image data D2. Taking the pixel at the position 9 as an example, since the high frequency components of the pixels at the position 8, 9 and 10 are respectively +50, 0 and 0, the value of the pixel at the position 9 in the auxiliary image data D2 is calculated by: (0-50-0)*0.8=(−40). Taking the pixel at the position 7 as another example, since the high frequency components of the pixels at the position 6, 7 and 8 are respectively 0, +50 and +50, the value of the pixel at the position 7 in the auxiliary image data D2 is calculated by: (50-0-50)*0.8=0.

It should be noted that the calculations of the high frequency component and the auxiliary image data for each pixel as illustrated above are merely the examples for illustration, and should not be taken as the limitations of the invention. For example, the number of neighbor pixels that are taken as the references when calculating the high frequency component and the auxiliary image data and the way to calculate the luminance difference can vary with different design considerations.

Regarding the output image Dout, in one embodiment of the invention, the output circuit 140 may directly add the processed image data D1 and the auxiliary image data D2 together to generate the output image Dout. In another embodiment of the invention, the output circuit 140 may multiply the multiply image data D1 by a weighting value to obtain a first result, multiply the auxiliary image data D2 by another weighting value to obtain a second result, and then add the first result and the second result together to generate the output image Dout. The weighting values may be arbitrary numbers, and may be adjusted according to different system requirements.

It should be noted that the aforementioned "luminance" may comprise different pixel values according to the different color swatches. Take the RGB color swatch as an example, the aforementioned luminance calculation comprises the calculations of the red pixel value, the green pixel value and the blue pixel value. Take the YUV color swatch as an example, the aforementioned luminance calculation is the calculation of the luminance Y. Take the CMYK color swatch as an example, the aforementioned luminance calculation comprises the calculations of the cyan pixel value, the magenta pixel value, the yellow pixel value and the black pixel value.

Figure 2:
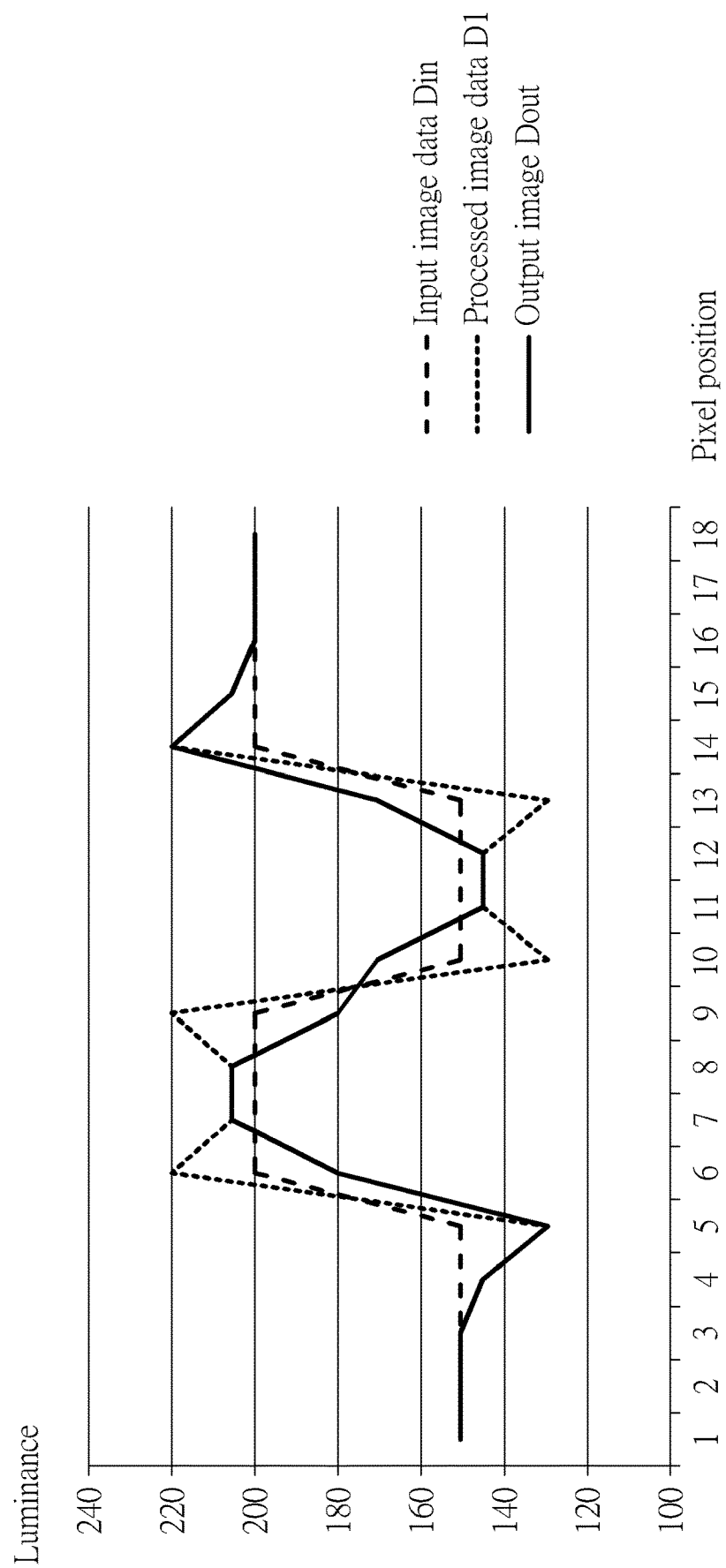
FIG. 2 is a schematic diagram showing the image data, the processed image data and the output image illustrated in Table 1 according to an embodiment of the invention.

FIG. 2 is a schematic diagram showing the image data Din, the processed image data D1 and the output image Dout illustrated in Table 1 according to an embodiment of the invention, where the X-axis represents the positions of the pixel and the Y-axis represents the luminance. As shown in FIG. 2, after adjusting the sharpness, in the processed image data D1, the edge luminance of an object is higher than its central luminance. In the embodiments of the invention, by using the auxiliary image data D2 to modify the processed image data D1, the conventional defect no longer exists in the output image Dout and the output image Dout can still be sharpened, thereby better display quality can be achieved.

Figure 3:
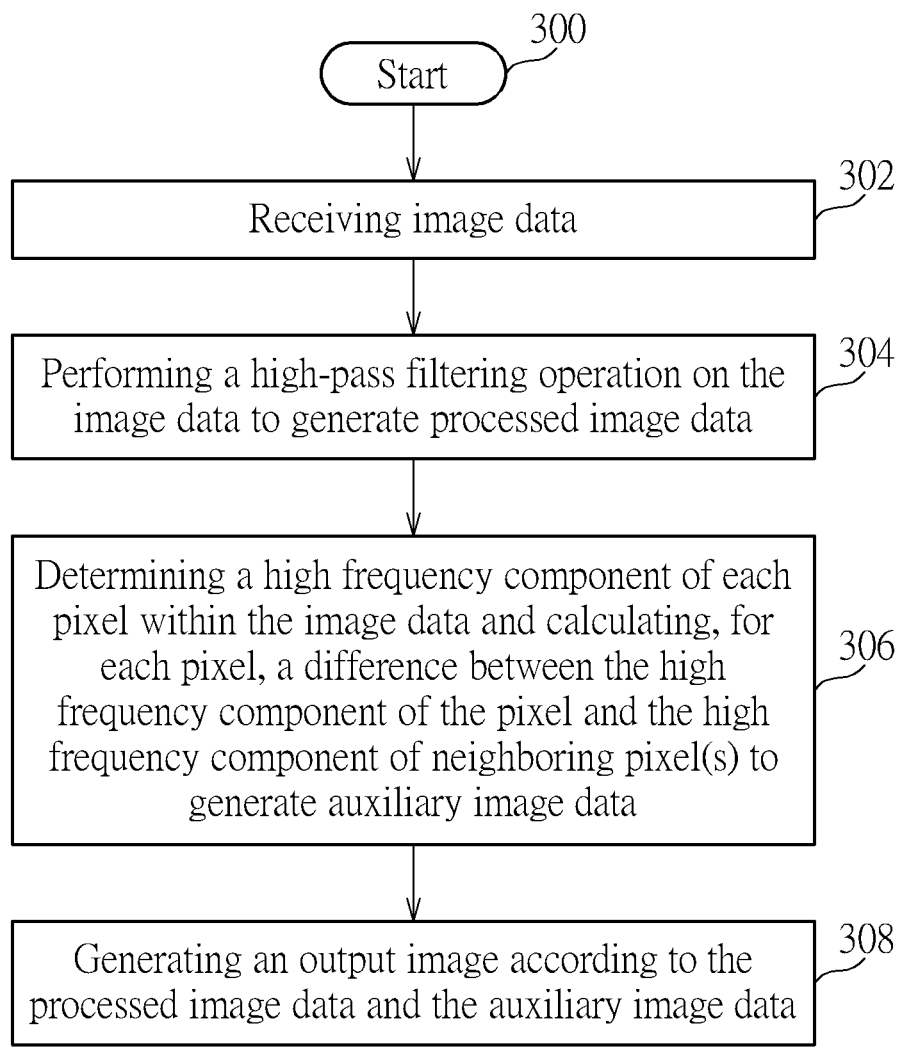
FIG. 3 is an exemplary flowchart of an image processing method according to an embodiment of the invention.

FIG. 3 is an exemplary flow chart of an image processing method according to an embodiment of the invention. Referring to the illustrations of the embodiments given above, the image processing method comprises the following steps:

Step 300: Start.

Step 302: Receiving image data.

Step 304: Performing a high-pass filtering operation on the image data to generate processed image data.

Step 306: Determining a high frequency component of each pixel within the image data and calculating, for each pixel, a difference between the high frequency component of the pixel and the high frequency component of neighboring pixel(s) to generate auxiliary image data. In one embodiment, in the step of determining a high frequency component of each pixel, the high frequency component may be determined by calculating, for each pixel of a plurality of consecutive pixels, the high frequency component of the pixel according to whether a group of N pixels on one side of the pixel and a group of M pixels on another side of the pixel both have pixel(s) whose luminance are higher than luminance of the pixel or both have pixel(s) whose luminance are lower than the luminance of the pixel (or, whether there is any pixel whose luminance is higher than the luminance of the pixel in both N pixels on one side of the pixel and M pixels on another side of the pixel or whether there is any pixel whose luminance is lower than the luminance of the pixel in both N pixels on one side of the pixel and M pixels on another side of the pixel).

Step 308: Generating an output image according to the processed image data and the auxiliary image data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image processing circuit, comprising:
a receiving circuit, configured to receive image data;
a sharpness processing circuit, configured to perform a high-pass filtering operation on the image data to generate processed image data;

a luminance variation processing circuit, configured to determine a high frequency component of each pixel within the image data and calculate, for each pixel, a difference between the high frequency component of the pixel and the high frequency component of neighboring pixel(s) to generate auxiliary image data; and an output circuit, configured to generate an output image according to the processed image data and the auxiliary image data, wherein the image data comprises a plurality of consecutive pixels, and for each pixel of the plurality of consecutive pixels, the luminance variation processing circuit calculates the high frequency component of the pixel according to whether a group of N pixels on one side of the pixel and a group of M pixels on another side of the pixel both have pixel(s) whose luminance are higher than luminance of the pixel, or both have pixel(s) whose luminance are lower than the luminance of the pixel.

2. The image processing circuit of claim 1, wherein when the group of N pixels on one side of the pixel and the group of M pixels on another side of the pixel both have pixel(s) whose luminance are higher than the luminance of the pixel, or when the group of N pixels on one side of the pixel and the group of M pixels on another side of the pixel both have pixel(s) whose luminance are lower than the luminance of the pixel, the luminance variation processing circuit is configured to calculate a difference between the luminance of the pixel and at least one of the luminance of the N pixels and the M pixels to calculate the high frequency component.

3. The image processing circuit of claim 1, wherein when not both the group of N pixels on one side of the pixel and the group of M pixels on another side of the pixel have pixel(s) whose luminance is/are higher than the luminance of the pixel, or not both the group of N pixels on one side of the pixel and the group of M pixels on another side of the pixel have pixel(s) whose luminance is/are lower than the luminance of the pixel, the luminance variation processing circuit is configured to directly set the high frequency component of the pixel to zero or a default value.

4. The image processing circuit of claim 1, wherein N and M are the same or different positive integers.

5. The image processing circuit of claim 1, wherein for each pixel, the luminance variation processing circuit is configured to calculate a difference between the high frequency component of the pixel and the high frequency component of neighboring pixels on both sides of the pixel to generate the auxiliary image data.

6. The image processing circuit of claim 5, wherein the luminance variation processing circuit is configured to subtract the high frequency component of neighboring pixels on both sides of the pixel from the high frequency component of the pixel to obtain a result, and multiply the result by a ratio parameter to generate the auxiliary image data.

7. The image processing circuit of claim 1, wherein the output circuit is configured to directly add the processed image data and the auxiliary image data to generate the output image.

8. An image processing circuit, comprising:
a receiving circuit, configured to receive image data;
a sharpness processing circuit, configured to perform a high-pass filtering operation on the image data to generate processed image data;
a luminance variation processing circuit, configured to determine a high frequency component of each pixel within the image data and calculate, for each pixel, a difference between the high frequency component of the pixel and the high frequency component of neighboring pixel(s) to generate auxiliary image data; and an output circuit, configured to generate an output image according to the processed image data and the auxiliary image data, wherein the output circuit is configured to multiply the processed image data by a weighting value to obtain a first result, multiply the auxiliary image data by another weighting value to obtain a second result, and add the first result and the second result to generate the output image.

9. An image processing method, comprising:
receiving image data;
performing a high-pass filtering operation on the image data to generate processed image data;
determining a high frequency component of each pixel within the image data;
calculating, for each pixel, a difference between the high frequency component of the pixel and the high frequency component of neighboring pixel(s) to generate auxiliary image data; and
generating an output image according to the processed image data and the auxiliary image data,
wherein the image data comprises a plurality of consecutive pixels, and the step of determining a high frequency component of each pixel within the image data further comprises:
calculating, for each pixel of the plurality of consecutive pixels, the high frequency component of the pixel according to whether a group of N pixels on one side of the pixel and a group of M pixels on another side of the pixel both have pixel(s) whose luminance are higher than luminance of the pixel, or both have pixel(s) whose luminance are lower than the luminance of the pixel.

10. The image processing method of claim 9, wherein when the group of N pixels on one side of the pixel and the group of M pixels on another side of the pixel both have pixel(s) whose luminance are higher than the luminance of the pixel, or when the group of N pixels on one side of the pixel and the group of M pixels on another side of the pixel both have pixel(s) whose luminance are lower than the luminance of the pixel, the method further comprises:
calculating a difference between the luminance of the pixel and at least one of the luminance of the N pixels and the M pixels to calculate the high frequency component.

11. The image processing method of claim 9, wherein when not both the group of N pixels on one side of the pixel and the group of M pixels on another side of the pixel have pixel(s) whose luminance is/are higher than the luminance of the pixel, or not both the group of N pixels on one side of the pixel and the group of M pixels on another side of the pixel have pixel(s) whose luminance is/are lower than the luminance of the pixel, the method further comprises:
directly setting the high frequency component of the pixel to zero or a default value.

12. The image processing method of claim 9, wherein N and M are the same or different positive integers.

13. The image processing method of claim 9, wherein the step of calculating, for each pixel, a difference between the high frequency component of the pixel and the high frequency component of neighboring pixel(s) to generate auxiliary image data further comprises:

calculating, for each pixel, a difference between the high frequency component of the pixel and the high frequency component of neighboring pixels on both sides of the pixel.

14. The image processing method of claim 13, wherein the step of calculating, for each pixel, a difference between the high frequency component of the pixel and the high frequency component of neighboring pixels on both sides of the pixel further comprises:

subtracting the high frequency component of neighboring pixels on both sides of the pixel from the high frequency component of the pixel to obtain a result, and multiplying the result by a ratio parameter to generate the auxiliary image data.

15. The image processing method of claim 9, wherein the step of generating an output image according to the processed image data and the auxiliary image data further comprises:

directly adding the processed image data and the auxiliary image data to generate the output image.

16. The image processing method of claim 9, wherein the step of generating an output image according to the processed image data and the auxiliary image data further comprises:

multiplying the processed image data by a weighting value to obtain a first result;

multiplying the auxiliary image data by another weighting value to obtain a second result; and adding the first result and the second result to generate the output image.

* * * * *